United States Patent
Smith

[15] 3,667,369
[45] June 6, 1972

[54] AIR DEFLECTION PLATE FOR A VEHICLE

[72] Inventor: Donald D. Smith, 3117 Homeway Drive, Cedar Falls, Iowa 50613

[22] Filed: Feb. 19, 1970

[21] Appl. No.: 12,594

[52] U.S. Cl. ............................................................98/2.12
[51] Int. Cl. ..........................................................B60h 1/24
[58] Field of Search...................................98/2, 2 B; 296/94

[56] References Cited

UNITED STATES PATENTS

| | | | |
|---|---|---|---|
| 1,777,569 | 10/1930 | Lillie | 98/2.2 |
| 2,622,920 | 12/1952 | Zagel | 98/2.2 |
| 2,764,928 | 10/1956 | Martinson | 98/2.2 |
| 1,922,159 | 8/1933 | Goldberg | 98/2.2 |
| 2,236,615 | 4/1941 | Wheeler | 98/2 |
| 2,679,201 | 5/1954 | Scharmen | 98/2.2 |
| 2,797,126 | 6/1957 | Brooks | 98/2.2 |

*Primary Examiner*—Meyer Perlin
*Attorney*—Zarley, McKee & Thomte

[57] ABSTRACT

An air deflection plate for use with a vehicle having a door with a vent window and a door window positioned therebehind. Upper and lower support members are secured to the vehicle door adjacent the upper and lower ends of the vent window. A U-shaped support extends outwardly from the support members and has a rear view mirror operatively secured thereto. The deflection plate is frictionally pivotally secured at its upper end to the upper support member and is frictionally pivotally secured at its lower end to the lower support member. The air deflection plate is comprised of clear safety plate glass and has an inner side edge which is complementary in shape to the exterior surface of the vent window. The air deflection plate is movable from a first position wherein the inner side edge of the plate is positioned closely adjacent the vent window to prevent air currents from passing between the air deflection plate and the vent window so that the air currents are deflected outwardly and rearwardly therefrom. A resilient molding strip is secured to the inner edge of the air deflection plate to effectively seal the inner side edge of the air deflection plate against the vent window. The air deflection plate is also pivotally movable to a second position wherein the inner side edge thereof is positioned forwardly and outwardly of the trailing edge thereof so that air currents may be deflected into the vehicle cab through the door window when the door window is lowered or opened.

4 Claims, 5 Drawing Figures

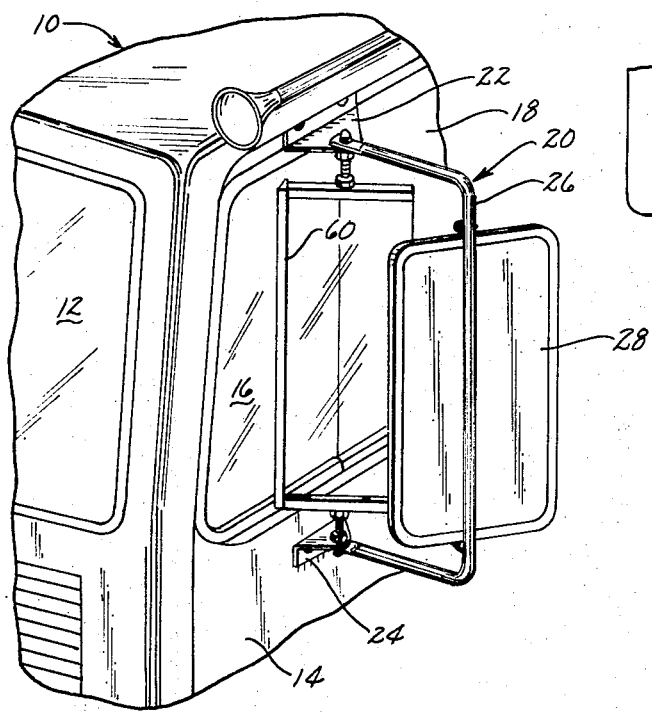
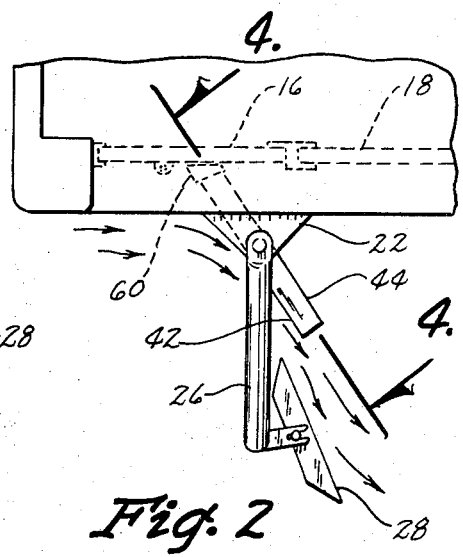
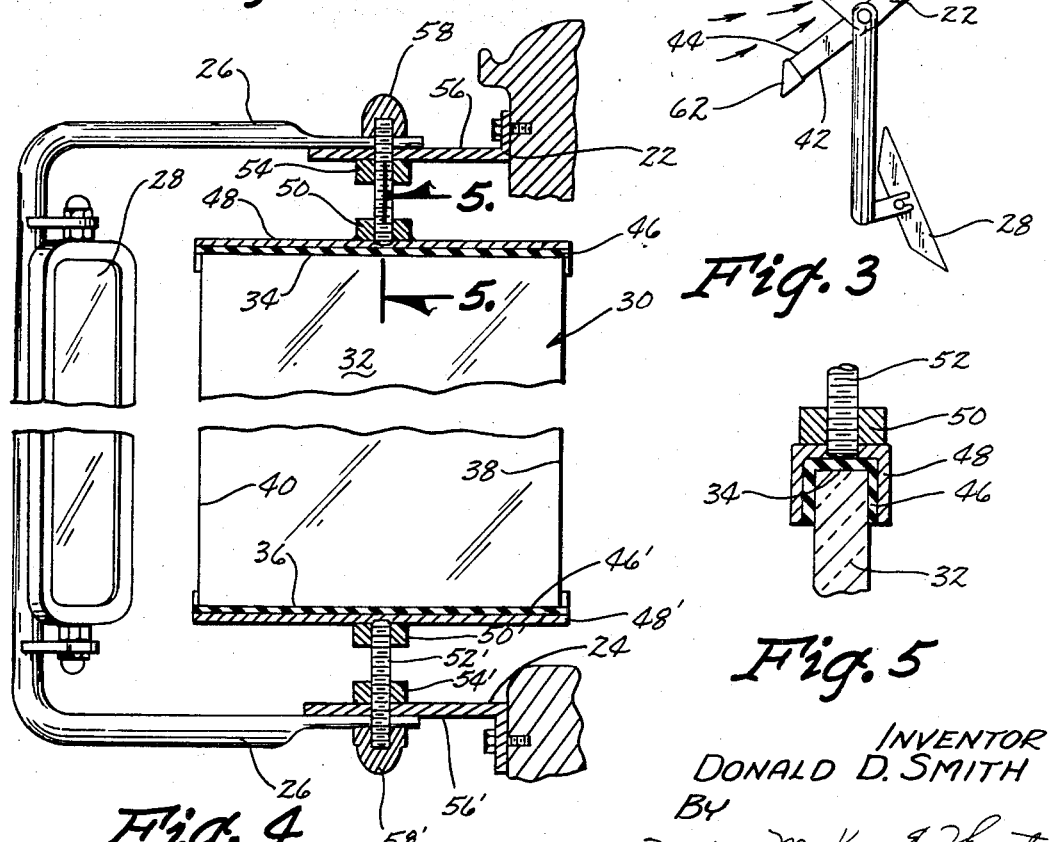
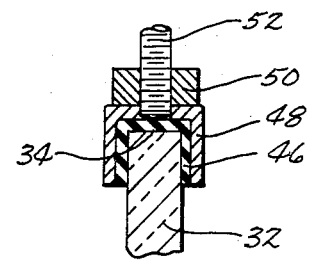
INVENTOR
DONALD D. SMITH
BY
Zarley, McKee & Thomte
ATTORNEYS

AIR DEFLECTION PLATE FOR A VEHICLE

Conventional over-the-road tractors or trucks ordinarily have a pivotal vent window and a side window mounted in each of the doors thereof. In weather conditions other than severe cold, the truck drivers usually open the side windows of their truck to maintain a fresh supply of air therein. In moderate winter weather, drivers like to open both of the side windows and operate the truck heater but this results in cold drafts being directed onto the driver. When the side windows are open in moderate rain or snow conditions, the rain and snow enters the vehicle through the open side windows. In summer, bugs enter the cab through these open side windows and objectionably litter the interior thereof. In addition, the bugs can distract the driver sufficiently to cause an accident. Additionally, the strong drafts entering the side windows disturb papers, clothes, etc., which are in the cab.

Even with the side windows closed, some annoyances are created by the air currents passing adjacent the side windows. In severe cold, with the side windows closed, the severe cold air passing adjacent these side windows greatly affects the temperature within the tractor cab. Further, the rear drive wheels of the tractor spray the outside rear view mirror with moisture when the tractor is being operated in wet conditions.

Therefore, it is the principal object of this invention to provide an air deflector plate for use with a vehicle.

A further object of this invention is to provide an air deflector plate which is positioned adjacent the vent window of the vehicle door to deflect the air outwardly and rearwardly of the side window thereof.

A further object of this invention is to provide an air deflector plate having a resilient molding mounted on the inner edge thereof which may be moved into a sealed condition on the vent window to positively prevent air currents from passing between the air deflection plate and the vent window.

A further object of this invention is to provide an air deflection plate which is frictionally pivotally mounted on the outside rear view mirror support of the vehicle.

A further object of this invention is to provide an air deflection plate which is pivotally mounted adjacent the vent window and which may be pivotally moved so as to deflect air into the vehicle cab through the open side window.

A further object of this invention is to provide an air deflection plate which prevents the rear drive wheels of the vehicle from spraying moisture onto the rear view mirror.

A further object of this invention is to provide an air deflection plate which is conveniently attached to the support for the outside rear view mirror of the vehicle.

A further object of this invention is to provide an air deflection plate for a vehicle which is comprised of a safety plate glass material.

A further object of this invention is to provide an air deflection plate for a vehicle which is economical to manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a partial front perspective of the vehicle cab having the air deflection plate of this invention pivotally mounted on the rear view mirror support.

FIG. 2 is a top plan view of the air deflection plate of this invention illustrating the same being positioned in the first position.

FIG. 3 is a view similar to FIG. 2 except that the air deflection plate has been pivotally moved to a second position.

FIG. 4 is an enlarged partial sectional view as seen along line 4—4 of FIG. 2.

FIG. 5 is an enlarged sectional view as seen along line 5—5 of FIG. 4.

The numeral 10 generally designates a vehicle cab having a windshield 12 and a side door 14. Door 14 includes a vent window 16 which is pivotally secured to the door 14 about a substantial vertical axis. A vertically movable side window 18 is vertically movably mounted in the door 14 rearwardly of the vent window 16.

The numeral 20 refers generally to an outside rear view mirror which is secured to the vehicle door 14. The numeral 22 and 24 designate upper and lower support members or brackets which are secured to the vehicle door by any convenient means such as screws, bolts, or the like. A U-shaped support 26 is pivotally secured to the brackets 22 and 24 as will be explained hereinafter and extends outwardly therefrom as illustrated in the drawings. A mirror 28 is pivotally secured to the support 20 about a vertical axis in the manner illustrated in FIG. 4.

The air deflection plate of this invention is generally referred to by the reference numeral 30 and comprises generally a plate portion 32 preferably constructed of a safety plate glass material. Plate portion 32 includes an upper end 34, lower end 36, inner side edge 38 and outer side edge 40. For purposes of description, portion 32 will be described as having a front surface 42 and a rear surface 44.

An elongated U-shaped gasket 46 preferably constructed of a resilient or rubber material embraces the upper end 34 of the plate portion 32 as illustrated in FIG. 5. A U-shaped channel 48 embraces the gasket 46 as illustrated in FIG. 5 and extends along the upper end of the plate portion 32. As seen in FIG. 4, nut 50 is secured to the channel 48 by any convenient means such as welding or the like. Nut 50 has a bolt or pivot pin 52 threadably mounted therein which extends upwardly therefrom. A nut 54 is threadably mounted on the bolt 52 above nut 50 at a point immediately below the outwardly extending horizontal portion 56 of bracket 22. Bolt 52 extends upwardly through the horizontal portion 56 and upwardly through a suitable opening in the support 26. A nut 58 is threadably mounted on the upper end of the bolt 52 and maintains the support 26, bracket 22 and nut 54 in frictional engagement with each other in the manner illustrated in FIG. 4. Thus, plate portion 32 can be rotated with respect to the vehicle but will encounter a frictional resistance, the frictional resistance also serving to maintain the plate portion 32 in its desired position. The numerals 46' and 48' refer to a gasket and channel mounted on the lower end of the plate portion 32 and which are identical to the previously described gasket 46 and channel 48. Nut 50' is secured to the channel 48' and has a bolt 52' extending downwardly therefrom. Nut 54' is threadably mounted on the bolt 52' immediately above the horizontal portion 56' of bracket 24. As seen in FIG. 4, bolt 52' extends through horizontal portion 56' and through the support 26. A nut 58' is threadably mounted on the lower end of the bolt 52' to maintain the nut 54', horizontal portion 56' and support 26 in the position illustrated in FIG. 4. The frictional engagement between the nut 54, horizontal portion 56', support 26 and nut 58' permits the plate portion 32 to be pivoted as described before while imposing a certain amount of frictional resistance so that the plate portion 52 will be yieldably maintained in its desired position. The numeral 60 refers to a resilient seal or gasket which is secured to the inner side edge 38 of body portion 32. Gasket 60 is preferably constructed of a suitable rubber material and includes a bevelled inner edge 62 which is adapted to be positioned against the exterior surface of the vent window 16 when body portion 32 has been pivoted to the position illustrated in FIGS. 1 and 2. When in the position of FIGS. 1 and 2, the bevelled surface 62 is substantially parallel to the exterior surface of the vent window 16 and prevents air currents from passing between the body portion 32 and the exterior surface of the vent window 16.

In use, the deflection plate 30 is secured to the rear view mirror support as previously described. The body portion 32 will be normally positioned in the position illustrated in FIG. 1 and 2 so that the gasket 60 engages the exterior surface of the vent window 16. As the vehicle is driven, the air currents engage the surface 42 of the body portion 32 and are deflected outwardly and rearwardly therefrom as illustrated by the arrows in FIG. 2. The driver may lower the side window 18 to any desired degree with the air deflection plate 30 serving to prevent air currents from entering the window. The air currents are deflected adjacent the mirror surface of the rear view mirror and prevents the spray from the rear drive wheels from being deposited thereon. The fact that the air currents are deflected outwardly and rearwardly with respect to the side window 18 prevents strong winds from coming in the open windows of the truck and prevents bugs and the like from entering the open window. The air deflection plate also permits the side window 18 to be lowered when the vehicle is being driven in moderate rain and snow conditions since the air currents are deflected outwardly and rearwardly with respect thereto. When the vehicle is being operated in severe cold, the window 18 would ordinarily be closed with the air deflection plate 30 deflecting the cold air outwardly and rearwardly from the closed side window which makes a large difference in the temperature in the cab.

When the vehicle is being used with the side window 18 lowered, air turbulence is eliminated within the cab and drafts on the driver are eliminated. Preferably, a deflection plate 30 would also be mounted at the other side of the vehicle to permit both of the vehicle side windows to be lowered during the operation thereof. FIG. 3 illustrates an alternate position to which the plate 30 may be pivoted with respect to the cab. In the position of FIG. 3, the driver may lower the side window 18 is desired so that the plate 30 will deflect air into the interior of the cab. The position of FIG. 3 would ordinarily be used in extremely warm weather and permits the amount of air directed thereinto to be closely adjusted to the selected pivotal movement of the plate.

Thus it can be seen that an extremely unique air deflection plate has been provided for use on a vehicle to permit the side windows thereof to be lowered without creating objectional air turbulence therein. The air deflection plate also deflects extremely cold air outwardly from the side windows when the vehicle is being operated in extremely cold weather. Thus it can be seen that the invention accomplishes at least all of its stated objectives.

I claim:

1. In combination with a vehicle door having a substantially vertically disposed vent window pivoted thereto about a vertical axis, said door having a vertically movable window mounted therein rearwardly of the vent window, a support means secured to the door,
   an air deflector window pivotally secured about a vertical axis to said support means outwardly of the vent window,
   said deflector window having an inner side edge complementary in shape to the exterior surface of said vent window,
   said deflector window being selectively movable to at least a first position wherein its inner side edge is closely adjacent said vent window to prevent air currents from passing between said side edge and said vent window, said deflector window deflecting air outwardly from said door and said vertically movable window when in its first position,
   said support means including spaced apart upper and lower support members operatively secured to said door, said deflector window being operatively pivotally secured at its upper end to said upper support member, said deflector window being operatively pivotally secured at its lower end to said lower support member, said upper and lower support members having support arms secured thereto which extend outwardly therefrom, and a rear view mirror means movably secured to the outer ends of said support arms.

2. The combination of claim 1 wherein a vertically disposed support arm extends between the outer ends of the outwardly extending support arms, said rear view mirror means being movably secured to said vertically disposed support arm.

3. In combination with a vehicle door having a substantially vertically disposed vent window pivoted thereto about a vertical axis, said door having a vertically movable window mounted therein rearwardly of the vent window, a support means secured to the door,
   an air deflector window pivotally secured about a vertical axis to said support means outwardly of the vent window,
   said deflector window pivotally secured about a vertical axis to said support means outwardly of the vent window,
   said deflector window having an inner side edge complementary in shape to the exterior surface of said vent window,
   said deflector window being selectively movable to at least a first position wherein its inner side edge is closely adjacent said vent window to prevent air currents from passing between said side edge and said vent window, said deflector window deflecting air outwardly from said door and said vertically movable window when in its first position,
   and a mirror device having a reflecting surface secured to said support means,
   said mirror device being positioned with respect to said deflector window so that when said deflector window is in said first position, air will be deflected over the forward surface of said deflector window and thence over the reflecting surface of said mirror as said vehicle proceeds in a forward direction.

4. The combination of claim 3 wherein the reflecting surface of said mirror is on the rearward portion thereof.

* * * * *